United States Patent
Wen (12) 
(10) Patent No.: US 6,798,118 B1
(45) Date of Patent: Sep. 28, 2004

(54) PIEZOCERAMIC SHAFT-DRIVING TYPE ULTRASONIC MOTOR

(75) Inventor: Fuh-Liang Wen, Hsinchu Hsien (TW)

(73) Assignee: Kingstate Electronics Corp., Taipei (TW)

( * ) Notice: Subject to any disclaimer, the term of this patent is extended or adjusted under 35 U.S.C. 154(b) by 0 days.

(21) Appl. No.: 10/612,917

(22) Filed: Jul. 7, 2003

(51) Int. Cl.⁷ .............................................. H01L 41/08
(52) U.S. Cl. .................................. 310/323.02; 310/328
(58) Field of Search .......................... 310/328, 323.02, 310/323.03, 316, 317, 71; H02K 41/08

(56) References Cited

U.S. PATENT DOCUMENTS

| | | | | |
|---|---|---|---|---|
| 4,833,359 A | * | 5/1989 | Tanoue et al. | 310/317 |
| 5,023,853 A | * | 6/1991 | Kawata et al. | 310/316.02 |
| 6,201,339 B1 | * | 3/2001 | Tani et al. | 310/328 |
| 6,288,473 B1 | * | 9/2001 | Mittas | 310/323.02 |
| 6,323,578 B1 | * | 11/2001 | Suzuki et al. | 310/323.02 |

* cited by examiner

*Primary Examiner*—Thomas M. Dougherty
*Assistant Examiner*—Karen Beth Addison
(74) *Attorney, Agent, or Firm*—Rosenberg, Klein & Lee (57) ABSTRACT

A kind of piezoceramic shaft-driving type ultrasonic motor is a piezoelectric disc device as the driving stator of the motor in which the A.C power is supplied to form extend-contract motion of piezoceramic based on converse piezoelectric effect. The flexural wave of back plate is generated by push-pull force of piezoceramic oscillation. By utilizing the pin head above the stator as the dynamic shaft bearing wherein the rotor being drive is connected directly on the bearing to transmit the power with friction contact force. The rotating speed of the prototype motor could be reached as high as 3000 rpm on the driving condition of 74 kHz, voltage +/−10Vpp, and 0.2 A current, wherein the torque is about 0.003 N·m. It could be utilized in the driver of CD, the actuator in the biomedical engineering, or the cooling fan in the computer CPU.

6 Claims, 11 Drawing Sheets

BODE

PIEZOCERAMIC SHAFT-DRIVING TYPE ULTRASONIC MOTOR

BACKGROUND OF THE INVENTION

1. Field of the Invention

This invention relates to a piezoceramic shaft-driving type ultrasonic motor which could avoid the electromagnetic interference (EMI) effects caused by the conventional electromagnetic motor, and it overcomes the output torsion disequilibrium in clockwise and counterclockwise rotation of the general ultrasonic motor wherein the rotating speed could be elevated above 3000 rpm and it could be used as the actuator on the biomedical engineering or the cooling fan of the computer CPU.

2. Description of the Prior Art

In the piezoelectric actuator, the piezoelectric ceramics plays important roles wherein the piezoelectric characteristic determines the performance of said actuator. Recently, along with the advance in the piezoelectric material, one of the piezoelectric actuator, the stack type actuator is broadly used in the application of the precise position control. Wherein the ultrasonic actuator of this invention is the mixed mode of bimorph actuator and ultrasonic motor, which adopts the unimorph piezoelectric material as raw materials.

The idea of ultrasonic motor was proposed by the former Soviet scientists wherein the original experimental model of the ultrasonic motor was designed by M. E. Archangelskij, V. Lavrinenko[1] in 1963–64. Later, the papers published by the study field of the ultrasonic motor have diversity study direction as well as study materials; however, most of them are focus upon the ring structure traveling waved type ultrasonic motors. The recently study was classified into the following: by mathematical model deduction, deformation and improvement according to the driving principle, as well as to analyze the vibration mode by utilizing the finite element method, etc [2–9].

For the mathematical model study of the ring-type ultrasonic motor, Oleg Yu. Zharii proposed to use the traveling wave ultrasonic motor as the study object to deduce a set of theory which is used to calculate the rotary speed of the rotor, velocity, the characteristic of piezoelectric, the energy transfer efficiency, etc [10]. By finite element vibration mode analysis [11], J. W. Krome and J. Wallaschek simulate the vibration mode through ANSYS software for the structural deformation as well as betterment. The surface acoustic of noncontact type ultrasonic motor by T.Yamazaki which transmits energy between the stator and rotor and bring the rotor to spin [12]. The noncontact ultrasonic has the better performance in the speed limit compared to that of the conventional contact type ultrasonic motor. Anita M. Flynn utilizes the MEMS technology to fabricate the microactuator as the motor stator device on the silicon wafer which ferroelectrics thin-film was fabricated in application to the piezoelectric ultrasonic motors [13].

SUMMARY OF THE INVENTION

An object of this invention is to provide a kind of piezoceramic shaft-driving type ultrasonic motor which breaks through the limitation in design of the conventional ultrasonic motor which should rely on the two-phase driving power to construct the traveling wave as well as the high amplitude input A.C. power.

Another object of this invention is to provide a kind of piezoceramic shaft-driving type ultrasonic motor which could avoid the electromagnetic interference effect generated by other conventional electromagnetic devices, and overcomes the phenomena of output torsion disequilibrium in clockwise and counterclockwise running for the general ultrasonic motor wherein the rotating speed could be elevated above 3000 rpm and it could be used in the actuator on the biomedical engineering or the cooling fan of the computer CPU.

The main components of the piezoceramic shaft-driving type ultrasonic motor which could achieve the above-mentioned object of invention are disc type piezoelectric device as the driving stator of the motor which utilizes the pin head above the stator as the dynamic shaft bearing wherein the rotor being drive is contact directly on the bearing with the bottom head of the shaft to transmit the power with friction contact force. The design and fabrication of the motor comprises the stator vibration mode observation and simulation, the measurement of the piezoelectric material impendence frequency response, the mechanical design of the traveling wave, system dynamic identification, the equivalent circuit deduction, as well as the measurement of rotary speed and the rotating torque, etc. The rotating speed of the prototype motor could be reached as high as 3000 rpm on the driving condition of 74 kHz A.C. voltage +/−10Vpp and 0.2 A current wherein the torque is about 0.003 N·m. It could be utilized in the driver of the CD, the actuator in the biomedical engineering or the cooling fan in the computer CPU.

BRIEF DESCRIPTION OF THE DRAWINGS

The drawings disclose an illustrative embodiment of the present invention that serves to exemplify the various advantages and objects hereof, and are as follows.

REPRESENTATIVE SYMBOLS OF MAJOR PARTS

1 Piezoelectric ceramic thin film
2 Metal back plate
203 Fixture
204 Base plate
205 Bearing
206 Bearing seat
207 Shaft
208 Stator
209 Weighting disc
21 Nail
210 Vibration thin sheet
22 Rotor
31 Carbon powder
32 Charge

DETAILED DESCRIPTION OF THE PREFERRED EMBODIMENT

Figure 1:
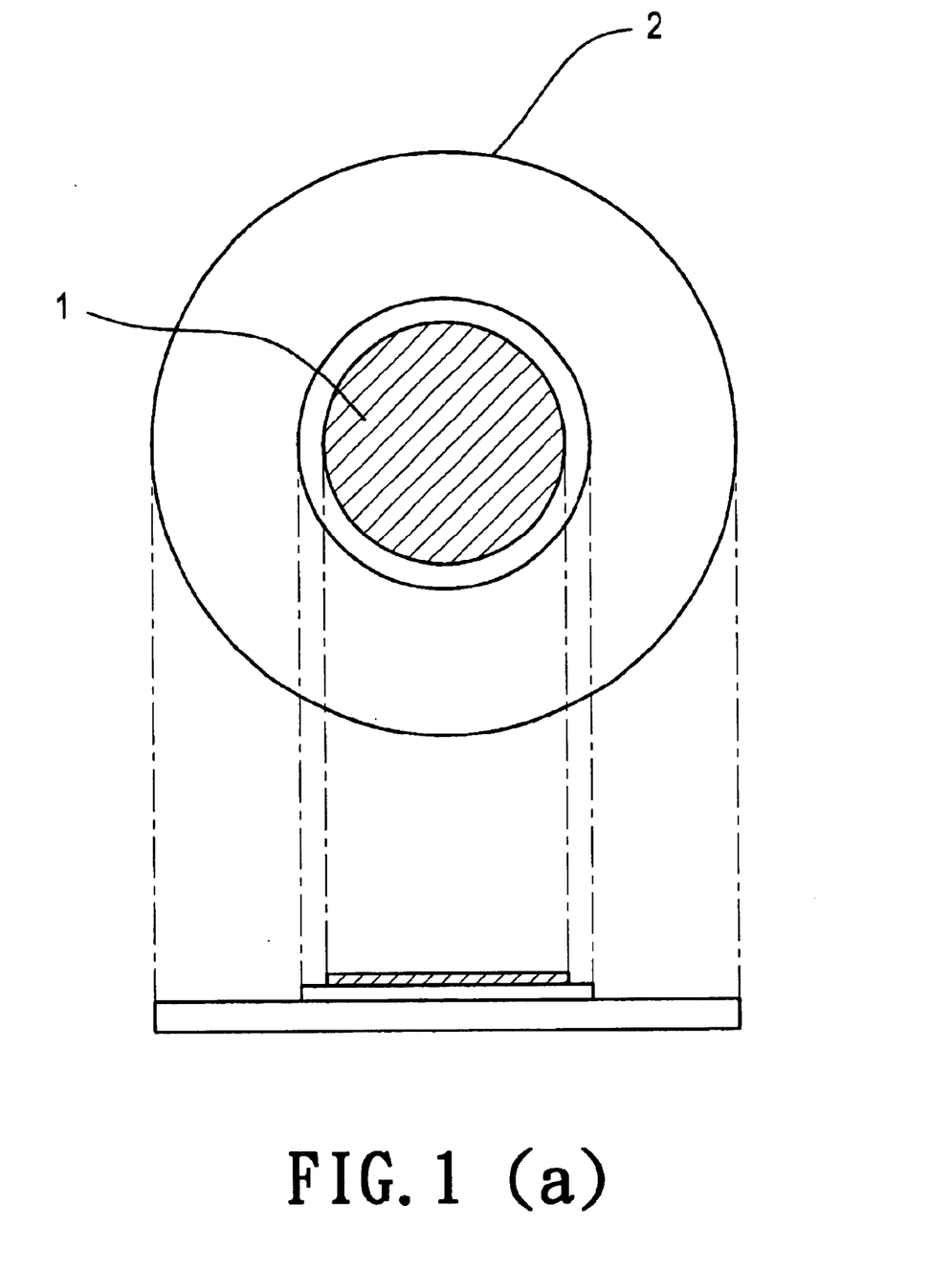
FIG. 1(a) is the basic structure of the disc device of the piezoceramic shaft-driving type ultrasonic motor of this invention.
FIG. 1(b) is the mechanism figure of said piezoceramic shaft-driving type ultrasonic motor of this invention.

The piezoceramic shaft-driving type ultrasonic motor provided by this invention utilizes the simple piezoelectric sheet with simple structure with the disc shape which is composed of a piezoelectric ceramic thin film 1 and a metal back plate 2 with elasticity wherein the structure is shown as FIG. 1(a), with smaller current consumption as well as more stable vibration motion.

The piezoceramic shaft-driving type ultrasonic motor uses the application of the oscillation of the piezoelectric actuator and with the aid to the fixing nail on the metal back plate to guide the output of the dynamic energy with its two composite paste sheets tightly face-to-face, to lock tightly three nails 21 on the outer ring of the round thin-sheet with symmetry 120 degree gap, and to lock a nail on the eccentric position of the thin sheet of the round plate as the driving body, wherein the rotor 22 is composed of a shaft on penetrating to the center of the weighting disc as shown in FIG. 1(b).

Figure 2:
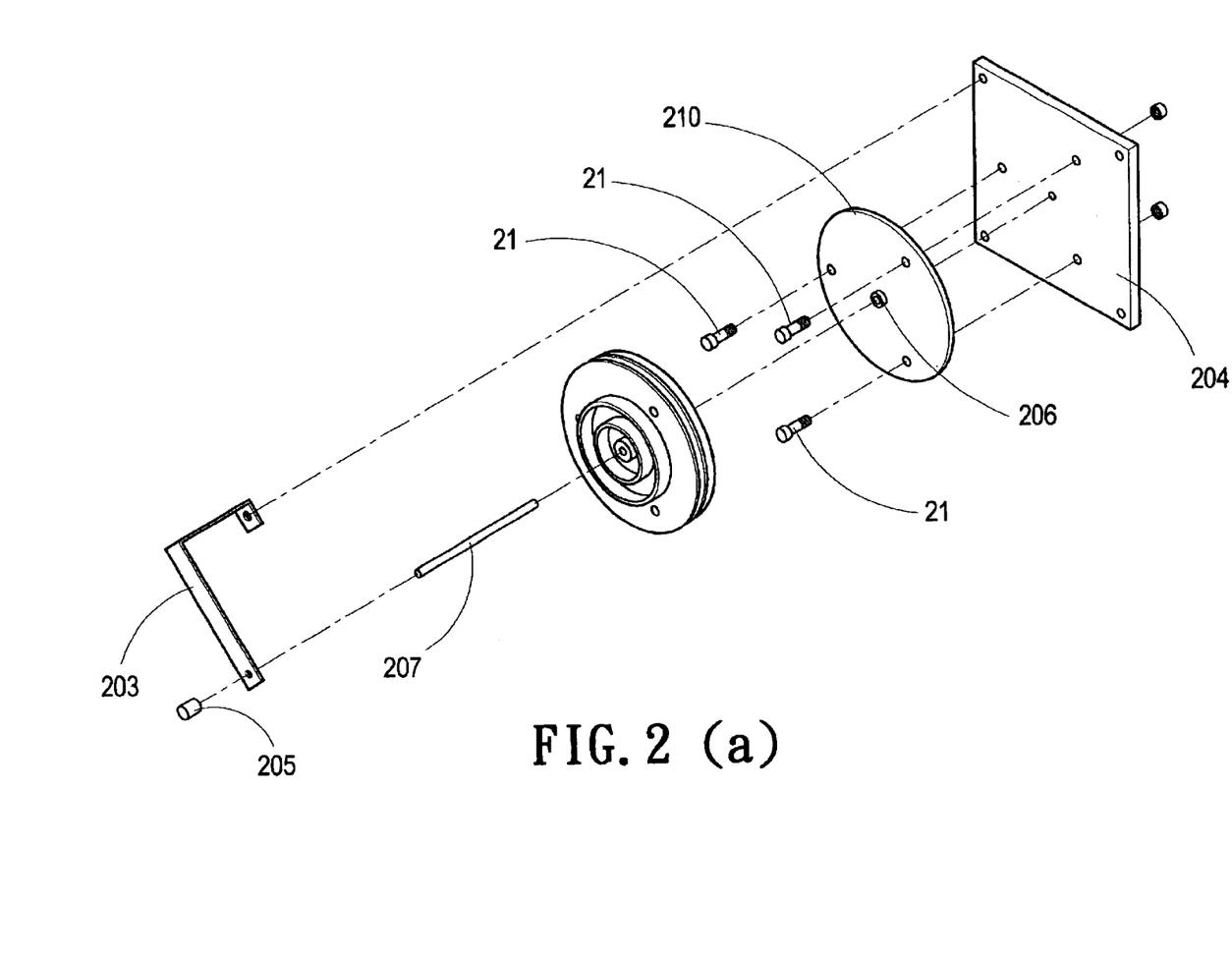
FIG. 2(a) is the exploded figure of said piezoceramic shaft-driving type ultrasonic motor of this invention.
FIG. 2(b) is the assembly figure of said piezoceramic shaft-driving type ultrasonic motor of this invention.
FIG. 2(c) is the lateral view of said piezoceramic shaft-driving type ultrasonic motor of this invention.

FIG. 2(a), FIG. 2(b) and FIG. 2(c), the piezoceramic shaft-driving type ultrasonic motor of this invention comprises a hollow structure shell which is consisted of the fixture 203 and the base plate 204, on the upper and lower lateral of said main body there is a rotor bearing 205 and a stator bearing seat 206 which is used to support the shaft 207 of the rotor, said shaft 207 of the rotor vertically penetrates and connects with a weighted disc 209, the bottom of the center of the shaft is settled on the bearing seat 206 of the stator 208 with its characteristic in that on the bottom of the structure shell of the main body there is a vibrating thin sheet 210 which could makes the shaft 207 of the rotor to rotate freely on supporting the weighted disc 209 to drive the thin plate stator to vibrate freely under the frequency of the ultrasonic by means of the A.C. signal and to guide the output of the vibration energy and the optimum working frequency range of the A.C. power of the input is between 20 kHz–200 kHz.

Figure 3:
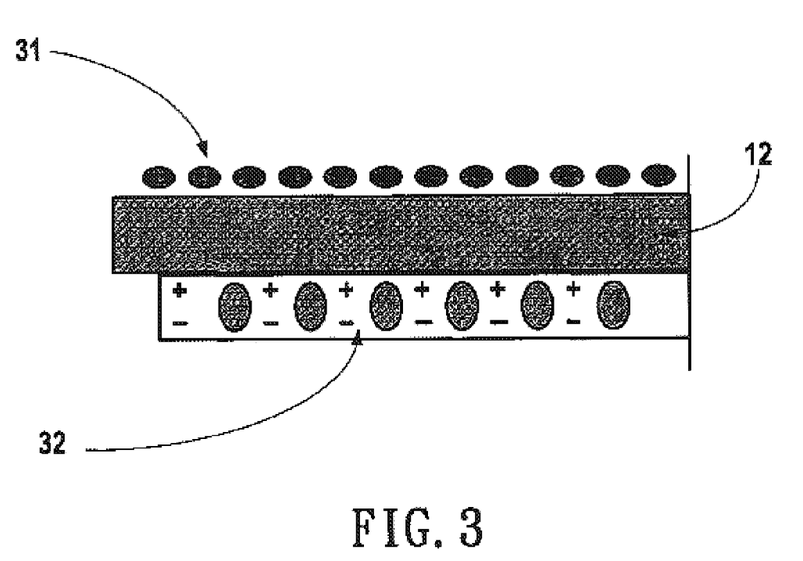
FIG. 3 is the illustration figure of the carbon powder being adhered upon the piezoelectric actuator.

The vibration of the thin-disc could be roughly classified as the traveling wave and the standing wave mode. In the related literature, the vibration mode observation involved is mainly the laser interference; however, this invention utilizes the carbon powder to observe the wave fluctuation on the metal back plate which working principle is the original capacitance feature of the piezoelectric material after polarization. As shown in FIG. 3, when it supplies the high-frequency electric field onto the piezoelectric sheet, sprinkle the carbon powder 31 onto the back plate 12. Carbon powder 31 was adhered on the metal back plate 12 by the charge accumulated and established by the electric field.

Under standing wave mode the carbon powder is concentrated on the nodal circle and the nodal diameter line, as shown in FIG. 4(a), FIG. 4(b), FIG. 7(a), FIG. 7(b), FIG. 8(a), FIG. 8(b), which could observe directly the mode figure being composed by the wave and the node. In comparison with the vibration mode method observed in application with the Michelson interference method, the development method used by this study having both directly and full-field observation function which is both simple and with efficiency; by utilizing the carbon development method to observe the vibration of the disc, it could roughly judge if the main vibration mode on the thin sheet is traveling wave mode or the standing wave mode by the clearness of the carbon powder figure wherein the carbon powder shows the dynamic figure according to the reflected wave; meanwhile, it could also be found the figure of the carbon powder being distributed that when the wave is in motion and it touches the refractive nail with more rigid material, the carbon powder on the wave nodal will remain the standing wave mode figure distributed toward the opposite direction on the round plate, which approves the existence of the reflected wave. If we compare the distribution mode of the carbon powder observed by the patterning method with that of the ultrasonic vibration mode simulated by the application of the finite element method, we could calculate the amplitude out-of-plane and the displacement and the deformation direction of the metal back plate.

Figure 5:
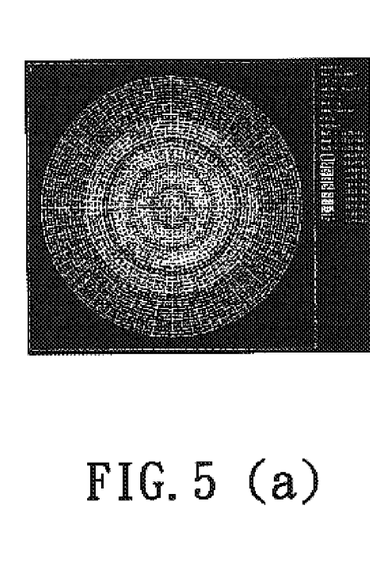
FIG. 5(a) is the simulation figure when the piezoelectric sheet is free with 20 kHz of ANSYS.
FIG. 5(b) is the simulation figure when the piezoelectric sheet is free with 20 kHz of ANSYS.

There are many mathematical equations about the ultrasonic motor to be published. However, since the physical model of the ultrasonic actuator is highly complex and it is changed as the structure is modified, the FEM software ANSYS is used to simulate and analysis the behavior of the ultrasonic actuator. It is more practicable and quickly than that with the mathematical equations established by the physical model; besides, it could realize the dynamic response mode of the metal back plate driven by piezoceramic which could verify the basic design principle of the driver to guide the direction of structure design. So, finite element analysis has its necessity. In other words, the major objects of using the ANSYS finite element analysis software to perform computer simulation are: (1) to achieve the optimum design of the ultrasonic actuator with the least time; (2) it could simulate the influence of various material toward the ultrasonic actuator; (3) it could understand clearly the variation condition of vibration on the metal plate. The finite element analysis could be preceded toward two portions: modal analysis and harmonic analysis; modal analysis could calculate out the natural resonance frequency of the piezoelectric sheet whereas harmonic analysis could calculate the dynamic response of the input of the A.C. voltage as shown in FIG. 5.

When the frequency of the input A.C. voltage, the piezoelectric sheet would acquire the maximum output power; besides, the acquired mode shape could be in comparison with that acquired by the carbon powder patterning, such as shown in FIG. 5(a) and FIG. 5(b).

To verify the correctness of the piezoelectric material parameter, it utilizes the finite element analysis software to calculate the natural resonance and the anti-resonance frequency of the piezoelectric sheet and performing comparison with the value being measured; if the results show that the value calculated by the natural resonance frequency using the finite element method is roughly the same with that measured by using the HP impedance analyzer, it means the simulated piezoelectric coefficient is very close to the actual value. The calculation is explained as follows:

The definition of the input impedance is:

$$Y = \frac{1}{v(=1 \text{ volt})} = \frac{jQ\omega}{1}$$

wherein I represents current; V represents the input voltage value with the value 1 volt; Q represents the total charge value induced by the input voltage 1 volt under the piezoelectric sheet electrode; $\omega$ represents the angle frequency.

Figure 6:
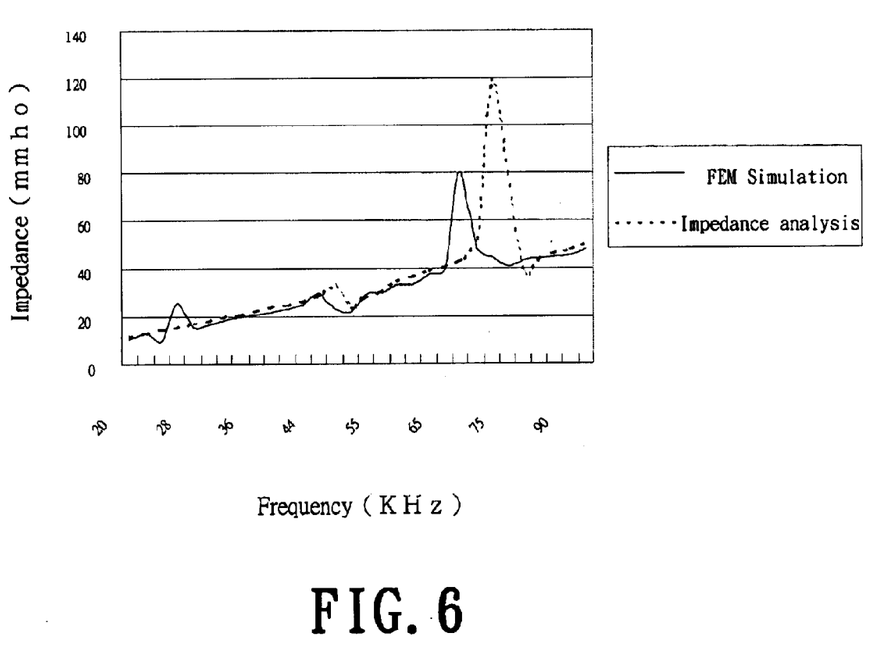
FIG. 6 is the figure of impendence and frequency response.

FIG. 6 is the calculation result using the finite element analysis software and the impendence vs. frequency response figure acquired using the HP impendence analyzer. The natural resonance frequency of the piezoelectric sheet is calculated through the finite element analysis software to be 67.5 kHz, whereas the value is 72.5 kHz which is the natural resonance frequency measured by the impendence analyzer, with the error 6.9%; said result explains that the material coefficient adopted by the finite element simulation is close to, but not the same as, that in the actual piezoelectric material, which means that there remains to be better and corrected for the piezoelectric coefficient obtained by the simulation of the finite element analysis software. From the figure it is seen that the value obtained by the calculation of using the finite element analysis software is higher than that measured by using the impendence analysis meter, because when simulates by the finite element method, the characteristic of the material and the structural damping is not to be considered, so the simulated value is higher than the measured one. Besides, for the drift of the natural resonance frequency, it is primary judged its when the geographical structure model of piezoelectric sheet is established in the ANSYS, although it inputs different material parameters individually, the metal back plate and the piezoelectric ceramics thin film are viewed as the same solid to perform synthesis analysis; however, in fact, the piezoelectric sheet is made of piezoelectric ceramics adhering the silver glue on the metal back plate, so the most access actual condition of the piezoelectric simulation is to use the shape function of the SHELL63 element coupling by the SOLID5 with piezoelectric material feature to analysis the wave behavior on the metal back plate; so it is inferred that whenever the piezoelectric and the metal material coefficient and the model construction it will requires further correction to acquire the more precise simulations. However, in summary, the above-mentioned error having no actual influence toward the qualities in analysis of this study which is sufficient enough to be the basis of the actuation analysis.

Generally speaking, the main form of vibration for the thin disc is Radial modes, wherein there are radius (R) direction as well as thickness direction for the vibration direction of the piezoelectric ceramics vibration; when applying the voltage, the thin disc will extend toward R direction; besides, since the possion's ratio, it will shrink in the thickness direction, so the circles of nodal circle will be seen on the thin disc, the number of the circular typed nodal will be elevated as the elevation of the frequency, as shown in FIG. 5(a) and FIG. 5(b), the position of the circular nodal is approximately the same as the value of the Bessel function. The wave equation on the round plate of the stator is described as the non-axis symmetrical free vibration form as follows:

$$\frac{\partial^2 w}{\partial r^2} + \frac{1}{r}\frac{\partial w}{\partial r} + \frac{1}{r^2}\frac{\partial^2 w}{\partial \theta^2} = \frac{1}{c^2}\frac{\partial^2 w}{\partial t^2} \quad (1)$$

If a is the radius of the round plate, the vibration characteristic solution is thus determined as in equation (2) utilizing the separation variable method and the known boundary condition:

$$w(r, \theta, t) = d_1 J_n\left(\alpha_m \frac{r}{a}\right) e^{\pm i\mu ct} \begin{cases} c_1 \cos n\theta \\ c_2 \cos n\theta \end{cases} \quad (2)$$

wherein n represents the number of nodal diameter line. Under the non-axis symmetry free vibration condition, the wave equation on the round plate is not roughly the zero-order Bessel function, with its number of order being determined by n in equation (2). Bessel function is an oscillating function with the decreasing amplitude and almost peridic function with its character of periodic oscillation the same as that observed using the carbon powder patterning. And once the vibration plane forms the standing wave in the arc direction, the n value is determined by the number of nodal lines.

Utilizing the above-mentioned refer results in coordination with the figure by the carbon powder patterning experiment and observed by the finite element dynamic simulation, we can conclude baldly that its wave equation belongs the first Bessel function wth n order under the condition of non-axis symmetry vibration of the piezoelectric thin film.

The standing wave mode acquired by the carbon powder experiment and the FEM simulation could be discussed in two boundary conditions: (a) the sound frequency to the ultrasonic vibration mode figure when the boundary is free; (b) the variation of the vibration mode of the piezoelectric sheet when the nail is put and there is support for the boundary.

Figure 4:
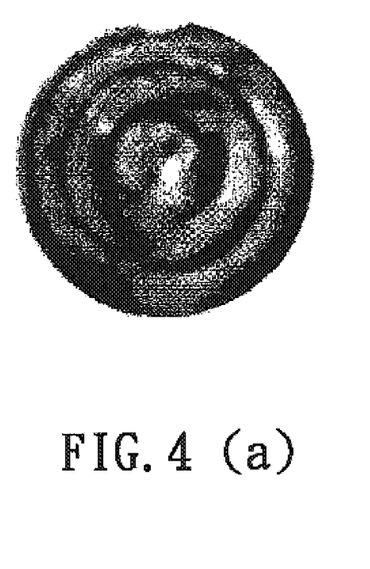
FIG. 4(a) is the patterning figure of the carbon powder when the piezoelectric sheet is free with 20 kHz at its boundary.
FIG. 4(b) is the patterning figure of the carbon powder when the piezoelectric sheet is free with 74 kHz at its boundary.

(a) Free Boundary Condition:

FIG. 4(a) and FIG. 4(b) are the standing wave carbon powder figure generated under the scope of the free boundary sound frequency as well as ultrasonic frequency range, wherein FIG. 5(a) and FIG. 5(b) is the corresponding FEA vibration mode simulation figure, from the carbon powder figure it is seen that the figure under the sound frequency it could distinguish the nodal position roughly, wherein under the ultrasonic frequency it is obviously seen the ring shaped nodal distribution. It shows that since the thin sheet is working under the sound frequency, the output power output by vibration is smaller than the power with the ultrasonic range and the wavelength is shorten as the frequency enhances, wherein the energy of the carbon powder moving into the nodal position is in direct proportion with distance, so the shorter the wavelength the shorter the moving distance of carbon powder, which illustrates the reason why the ultrasonic is figure is more obvious: besides being influenced by the wavelength, the degree of clarity of the figure of the carbon powder is mainly influenced by the output of the power. So the thin sheet could be observed the surface vibration clearly through the carbon powder patterning, the ideal stator driving voltage frequency is below 100 kHz since it has larger output power.

Figure 7:
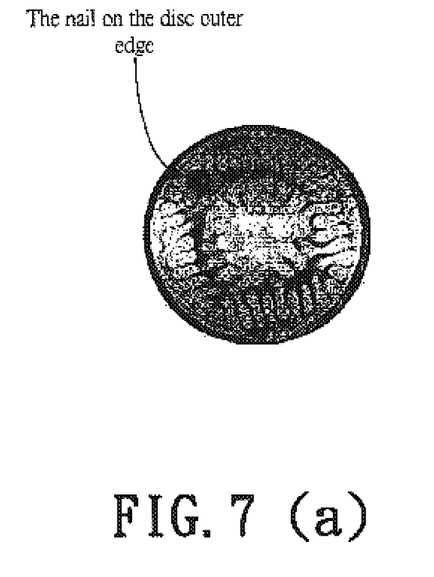
FIG. 7(a) is the ANSYS simulation figure when the nail is fixed.
FIG. 7(b) is the ANSYS simulation figure when the nail is fixed.

(b) Under the Support Condition of Boundary:

FIG. 7(a) and FIG. 7(b) show the carbon powder figure and the simulation figure when the amplitude becomes zero with the extra addition of the nail on the disc outer edge. From that figure it is seen and observed clearly the radial nodal distribution besides the ring shaped nodal distribution. Such phenomena shows that there exists two directions of standing wave motion, one is to form the ring-shaped distribution along the radial direction, the other is to form the radial distribution along the arc facet. Since the nail is fixed, it is a refractor for the wave with larger relative density of medium, its refractive condition is larger than that of diffraction which makes obvious distribution of the radial nodal; besides, there generates different standing wave mode along with the nail being in position of the radial ring or the radial ring peak. Thus we could utilize the nail to change the style of thin plate vibration to design the dynamic transmission mode of the piezoelectric actuator.

Figure 8:
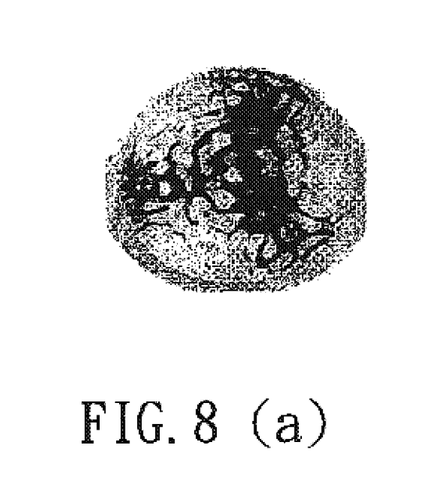
FIG. 8(a) is the patterning figure of the carbon powder of the stator on which there adds three nails with 120 degree separation.
FIG. 8(b) is the ANSYS simulation figure of the carbon powder of the stator on which there adds three nails with 120 degree separation.
Figure 9:
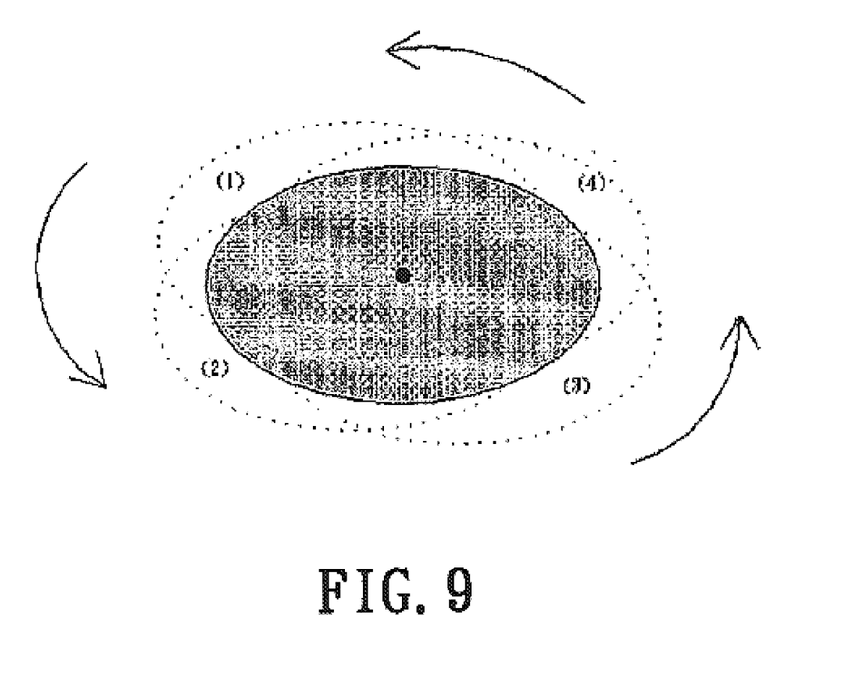
FIG. 9 is the illustration figure of the nail in eccentric motion.
Figure 10:
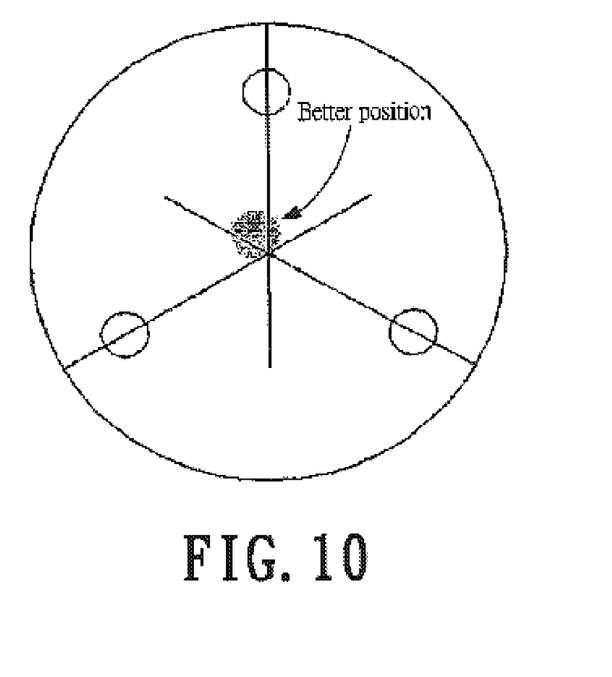
FIG. 10 is the illustration figure of the nail in better position.

Under the allocation of three reflected nails separated each 120 degree, FIG. 8(a) and FIG. 8(b) shows the distribution of the nodal on the metal back plate. The push force operated by the rotor is transmitted by the wave motion on the stator, so the contact position should be settled on the maximum position of the amplitude. The momentum transfer on the contact point also utilizes the pushing force from three directions to make the nail generating the ecentric penpendum shown in FIG. 9. If we observe from the nail itself, we could suppose that there exists the wave on the periphery of the nail. So FIG. 10 is the allocation figure of ideal contact point.

The basic working principle is summarized as follows: using the piezoelectric sheet as the media of the electric energy and the mechanical energy conversion. When the adding a.c. voltage on the piezoelectric sheet, it generates the push and pull force through the relation of extention and shrinkage due to converse piezoelectric effect which makes the metal back plate to extend and shrink to generate the mechanical wave and transmit along the radal and arc direction. Since the difference between the material performance of the nail and that of the metal back plate fabricated by Ni alloy, during the transmission of the wave, nail becomes a reflected point. By utilizing the reflected point composited by outer three nails, the reflected wave could be guided back to the center of circles to swing the ecentric nail wherein the carbon powder and the simulation figure is shown as FIG. 8(a) and FIG. 8(b), respectively. The walking distance of the reflected wave makes the existence of the phase difference on reaching, if we choose a proper driving point, a three-phase traveling wave circulating said point on said position is form and achieve the purpose of three-phase driving to provide the torque toward the rotating such to rotate the rotor.

Since there still exists some variables for the piezoelectric material according to the rightnow recognition such as temperature elevation, wave fluctuation, etc, which is not to be clearly clerified, so if we use the conventional exist complex physical model to set-up such system, it will never depict the dynamic of the motor completely and correctly. However, the design of this experiment is to solve out the dynamic transfer function of such system by acquisiting the voltage and current signal on both ends of the piezoelectric actuator when the motor is working as the basis for the construction of said system as well as the subsequent equivalent circuit deduction.

The sampling frequency of 1 MHz was adopted on the acquisition of the input voltage and output current signal , which could synthesize a discrete transfer function G(B) with the order number (5/5), which is represented as equation (3):

$$G(B) = \frac{0.0926 - 0.2304B + 0.0316B^2 + 0.0810B^3 + 0.1043B^2 - 0.1465B^5}{1 - 0.2290B - 0.7128B^2 - 0.3888B^3 + 0.8177B^4 + 0.0800B^5} \quad (3)$$

Using the partial equation method to develop equation (3) into equation (4), the correlated coefficient is:

$$G(B) = B\left\{\sum_{i=1}^{5} \frac{g_i}{1 - \lambda_i B}\right\} + K \quad K = 0.0926 \quad (4)$$

In the table (c) part, $\lambda_5$ is a first order transfer function, since the piezoelectric ceramics itself is a capacitance material, it is assumed that $\lambda_5$ dynamic mode of said first order function is caused by the characteristic of ceramic inhibition capacitance; (b) portion $\lambda_{3,4}$ dynamic mode with its resonant frequency of about 64.3 kHz which is roughly the same as the resonant region of 72 kHz of the piezoelectric ceramics, it is referred that said dynamic mode should represent the performance of said resonant region.

| (dynamic mode) | (a) $\lambda_{1,2}$ | (b) $\lambda_{3,4}$ | (c) $\lambda_5$ |
|---|---|---|---|
| $\lambda_1$ | −0.7177 ± 0.6437i | 0.8794 ± 0.3735i | −0.0943 |
| $g_i$ | −0.0185 ± 0.0051i | 0.0031 ± 0.0075i | −0.1782 |
| Natural frequency ($f_n$) | 383.69 kHz | 64.33 kHz | — |
| Corner frequency ($f_b$) | — | — | 625 kHz |
| Damping ratio (ζ) | 0.0152 | 0.1129 | — |

(a) part of $\lambda_{1,2}$ dynamic mode, since its resonant frequency 383.69 kHz is far away from the working frequency of the motor, said this dynamic mode is not the key issue influencing the stability of said system. Removing $\lambda_{1,2}$ dynamic mode while reserving $\lambda_{3,4}$ and $\lambda_5$ dynamic mode with larger correlation of the system characteristic, the original system dynamic transfer function could be modified as formula (5):

$$G(B) = \frac{0.0926 - 0.3263B + 0.3723B^2 + 0.1558B^3}{1 - 1.6644B + 0.7469B^2 + 0.0861B^3} \quad (5)$$

Besides, according to the equivalent concept of the system transfer value (B=1 or w=0) after the oder reduction, the D.C. gain is solved to be −0.021 as compensation value. Replace it into equation (5) the system transfer function G*(B) after compromise could be solved, as shown in equation (6):

$$G^*(B) = \frac{0.0716 - 0.2913B^1 + 0.3566B^2 - 0.1576B^3}{1 - 1.6644B^1 + 0.7469B^2 + 0.0861B^3} \quad (6)$$

Figure 11:
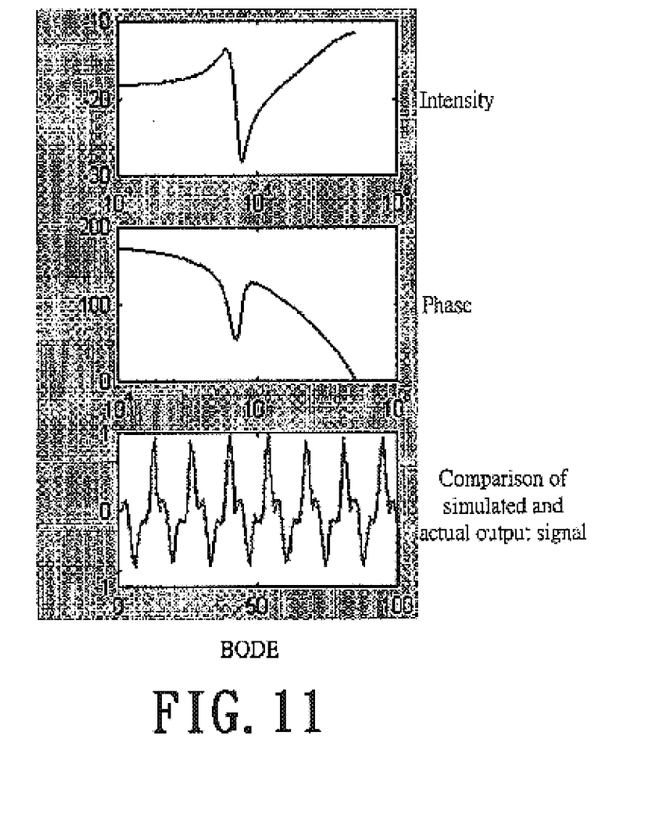
FIG. 11 is the system bode plot after the gain compensation and the figure of simulation output signal.

FIG. 11 is the simulation of this system toward this transfer function, from the figure it is observed that there is no error for the observed simulated current and the actual signal.

Since the sampling time is short, the discrete system in equation (7) could be transferred into the transfer function of continuous system through bilinear transfer way as shown in equation (8), (9), (10):

$$G^*(B) = \underbrace{\frac{-0.1782B}{1+0.0943B}}_{(a)\lambda_5 \text{dynamic mode}} + \underbrace{\frac{0.0062B - 0.01105B^2}{1 - 1.7588B + 0.9128B^2}}_{(b)\lambda_{3,4}\text{dynamic mode}} + \underbrace{0.0716}_{(c)D.C. \text{ gain}} \quad (7)$$

$$H^{(a)}(S) = \frac{0.197S - 0.394 \times 10^6}{S + 2.416 \times 10^6} \quad (8)$$

$$H^{(b)}(S) = \frac{-4.700 \times 10^{-3} S^2 + 1.204 \times 10^4 S - 5.284 \times 10^9}{S^2 + 9.500 \times 10^4 S + 1.678 \times 10^{11}} \quad (9)$$

$$H^{(c)}(S) = 0.0716 \text{ (the same D.C. gain)} \quad (10)$$

However, the final dynamic transfer function of said continuous system is shown as the following equation:

$$H(S) = H^{(a)}(S) + H^{(b)}(S) + H^{(c)}(S)$$

$$= \frac{0.2639S^3 - 1.946 \times 10^5 S^2 + 4.789 \times 10^{10} S - 4.990 \times 10^{16}}{S^3 + 2.511 \times 10^6 S^2 + 3.973 \times 10^{11} S + 4.054 \times 10^{17}}$$

Figure 12:
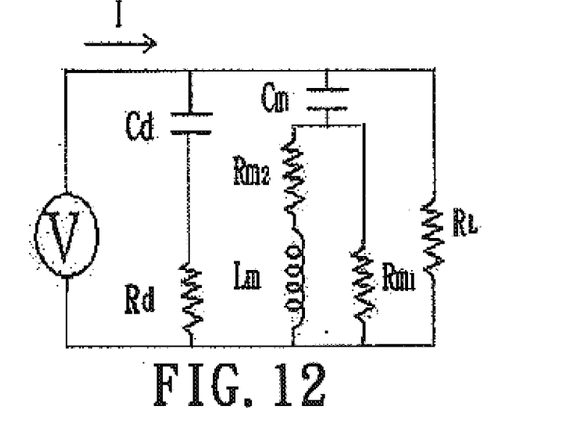
FIG. 12 is the equivalent circuit figure of the stator when the motor are working.
Figure 13:
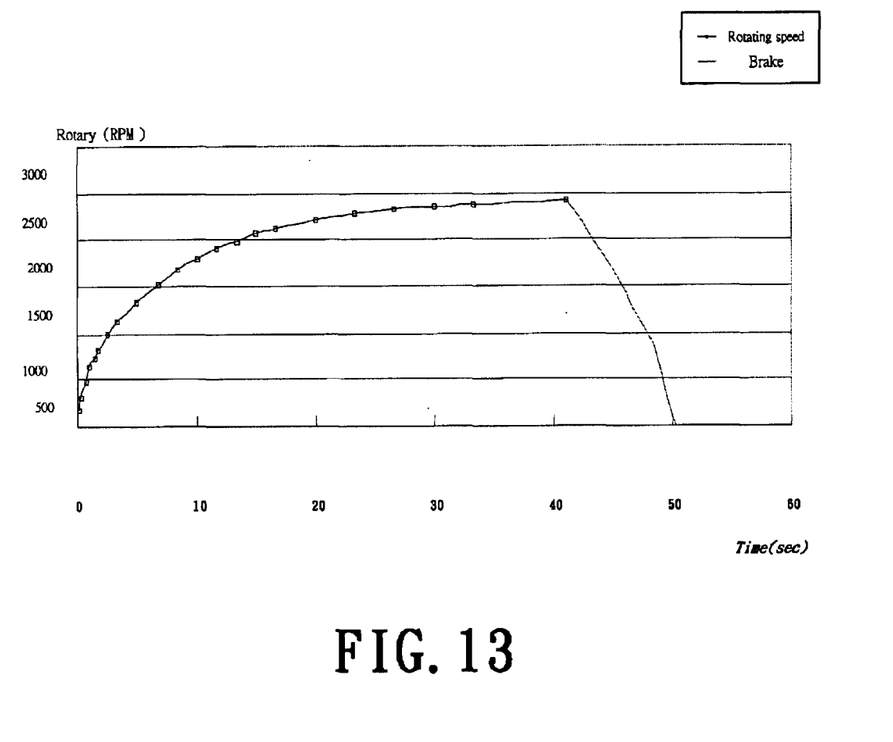
FIG. 13 is the relation figure between the rotary speed of the motor and time.

By utilizing the result of the above equation the equivalent circuit model of the ultrasonic motor shown in FIG. 12 could be deduced wherein each value of device is: Cd=148.8 nF, Rd=2.781 Ω, Cm=89.6 nF, Rm1=37.3Ω, Rm2=−9.943 Ω, Lm=48.8 μH, and RL=−8.15 Ω respectively. Since the piezoelectric ceramics itself having the direct piezoelectric effect which could transfer the vibration of the stator into the voltage output, so the ceramics having the feature of voltage feedback for the working system, so RL rightly reflects that the characteristic of the equivalent circuit of the negative resistor which is disappeared for the general physical model of piezoelectric.

The measurement way toward the torque of the rotating speed of the ultrasonic motor is from initiating, stabilizing operation as well as brake to stop wherein the rotating speed vs. time relationship appears to be curve which means that its acceleration should be varied. However, during the period of stabilize operation until the time to brake and stop, its speed variation is a linear, which means that the speed decrease is a constant. This phenamena of said variation acceleration could prove that dynamic transfer obeys the feature of dry friction model, which means that the piezoelectric actuator stator will pushes or brakes the operation of the rotor through the friction force generated by the relative motion during the working period. So as the elevation of the rotor speed, the region of the stator has less relative speed to the rotor which caused the push force being in equilibrium with the friction force wherein the torque output is zero; when the motor stop working, the stator stop to provid the kinetic energy for oscillation toward the rotor in which only serves constant the friction force.

The piezoceramic shaft-driving type ultrasonic motor of this invention breakthrough the limitation of the conventional ultrasonic motor which should rely on two-phase driving power to construct the traveling wave and high-amplitude voltage input on design; on the construction of the equivalent circuit, if we could further investigate the meaning of each capacitor, inductor or resistor in the circuit which corresponds to the piezoelectric substances, it will inhibit the temperature elevation effect caused by the operation of the motor and further overcomes the condition of output torsion disequilibrium in clockwise and counterclockwise running for the general ultrasonic motor wherein the rotating speed could be elevated above 3000 rpm and it could be used in the actuator on the biomedical engineering or the cooling fan of the computer CPU.

The piezoceramic shaft-driving type ultrasonic motor of this invention having the following advantages in comparison with the conventional technologies:

1. The piezoceramic shaft-driving type ultrasonic motor of this invention breakthrough the limitation of the conventional ultrasonic motor which should rely on two-phase driving power to construct the traveling wave and high-amplitude input wave on design.

2. The piezoceramic shaft-driving type ultrasonic motor of this invention could resist the effects of electromagnetic interference caused from the conventional electromachine, and overcomes the condition of output torsion disequilibrium in clockwise and counterclockwise running for the general ultrasonic motor.

3. The rotating speed of the piezoceramic shaft-driving type ultrasonic motor of this invention could be elevated above 3000 rpm and it could be used in the actuator on the biomedical engineering or the cooling fan of the computer CPU.

REFERRENCES

[1] V. Snitka, V. Mizariene, D. Zukauskas, "The Status of Ultrasonic Motors in the former Soviet Union", Ultrasonics, Vol.34 (1996) pp.247–250

[2] Kenji Uchino, Piezoelectric Actuators and Ultrasonic Motors, Kluwer Academic Publishers, 1997.

[3] Toshiiku Sashida, Takashi Kenjo, An Introduction to Ultrasonic Motors, Clarendon Press Oxford, 1993.

[4] S. Ueha, Y. Tomikawa, M, Kurosawa and N. Nakamura, Ultrasonic Motors-Theory and Applications, Clarendon Press Oxford, 1993.

[5] N. W.Hagood IV and A. J.Mcfarland, "Modeling of a piezoelectric rotary ultrasonic motor" IEEE Trans. Ultrason. Ferroelec. & Freq. Contr, vol.42, no.2 (1995) pp.210–224.

[6] H.Hirata and S.Ueha, "Design of a traveling wave type ultrasonic motor", IEEE Trans. Ultrason. Ferroelec. & Freq. Contr., vol.42, no.2 (1995) pp.225–231.

[7] Riccardo Carotenuto, Nicola Lamberti, Antonio Iula and Massimo Pappalardo, "A new low voltage piezoelectric micromotor based on stator precessional Motion", IEEE Trans. Ultrason Ferroelec. & Freq. Contr., Vol.45.no.5 (1998) pp.1427–1434.

[8] Nicola Lamberti, Antonio Iula and Massimo Pappalardo, "A piezoelectric motor using flexural vibration of a thin piezoelectric membrane", IEEE Trans. Ultrason. Ferroelec. & Freq. Contr., Vol.45. no.5 (1998) pp.23–29.

[9] A.Daugela and H.Fujii, "FEM modeling of multilayered piezoactive structures", ANSYS 1994 Conference in Japan.

[10] Oleg Yu.Zharii, "Modeling of a model conversion ultrasonic motor in the regime of slip", IEEE Trans. Ultrasion. Ferroelec. & Freq. Contr, vol.40, no.4 (1993) pp.414–417

[11] J. W.Krome and J.Wallaschek, "Novel disk type ultrasonic traveling wave motor for high torque", IEEE Ultrasonic Symposium (1997) pp.385–39.

[12] T. Yamazaki, J. Hu, N. Nakamura, and S. Ueha, "Trial construction of a noncontact ultrasonic motor with an ultrasonically levitated rotor", Japan Journal of Apply Physics, vol. 35(1996) pp.3286–3288.

[13] Anita M. Flynn, Lee S. Tavrow, Stephen F. Bart, Rodney A. Brooks, Daniel J. Ehrich, K. R. Udayakumar, and L. E. Cross, "Piezoelectric micromotors for microrobots", *Journal of Micro-electromechanical System*, vol.1(1992) pp.44–51.

Many changes and modifications in the above described embodiment of the invention can, of course, be carried out without departing from the scope thereof. Accordingly, to promote the progress in science and the useful arts, the invention is intended to be limited only by the scope of the appended claims.

What is claimed is:

1. A method of actuating by the piezoceramic for shaft-driving type ultrasonic motor, which is to use the ultrasonic actuator composed by the round metal back plate composite with piezoelectric device, wherein there existing two geometrical orthogonal standing wave or the traveling wave in radial and arc direction under the resonant state of thin plate piezoelectric device;

utilizing such orthogonal vibration wave to form an shaft driving force instead of the traveling wave driven by the multi-electrode conventionally and the triple phase driving traveling waves were generated for motors according to the propagation difference of the wavelength of the driving point.

2. A piezoceramic shaft-driving type ultrasonic motor comprising a hollow structure shell, a shaft, a rotor bearing, a stator bearing seat, a weighted disc, and a stop-push bearing seat; thereof a rotor bearing and a stator bearing seat used to support the rotating shaft on the upper and lower lateral of said hollow structure shell; said rotating shaft penetrates through a weighted disc vertically, therein the bottom of the rotating shaft settled over said stop-push bearing seat on the thin plate of stator;

which characteristic is on the bottom of the structure shell settling a vibrating thin sheet which could makes the shaft of the rotor to rotate freely on supporting the weighting disc and to drive the thin plate stator to vibrate freely under the frequency of the ultrasonic by means of the input of the A.C. signal and to the output of the vibration energy.

3. The piezoceramic shaft-driving type ultrasonic motor as mention in claim 2, wherein the hollow structure shell could be replaced with L-type mechanical structure body.

4. The piezoceramic shaft-driving type ultrasonic motor as mention in claim 2, wherein on two end facet of said supporting hollow structure shell is orthogonal to the shaft of the rotor representing the vertical axis.

5. The piezoceramic shaft-driving type ultrasonic motor as mention in claim 2, wherein the supporting rotating shaft mechanism on the upper portion of said hollow structure shell could be connected with the bearing.

6. The piezoceramic shaft-driving type ultrasonic motor as mention in claim 2, wherein the optimum operating frequency of the input A.C. power is 20 kHz~200 kHz.

* * * * *